(12) United States Patent
Inge et al.

(10) Patent No.: US 11,167,243 B2
(45) Date of Patent: Nov. 9, 2021

(54) METHOD AND INSTALLATION FOR THE REDUCTION OF SULPHUR OXIDES IN EXHAUST GAS FROM MARINE DIESEL ENGINES

(71) Applicant: 3NINE AB, Nacka Strand (SE)

(72) Inventors: Claes Inge, Nacka (SE); Peter Franzen, Bandhagen (SE)

(73) Assignee: 3NINE AB, Nacka Strand (SE)

( * ) Notice: Subject to any disclaimer, the term of this patent is extended or adjusted under 35 U.S.C. 154(b) by 140 days.

(21) Appl. No.: 16/338,008

(22) PCT Filed: Jun. 12, 2017

(86) PCT No.: PCT/SE2017/050627
§ 371 (c)(1),
(2) Date: Mar. 29, 2019

(87) PCT Pub. No.: WO2018/231105
PCT Pub. Date: Dec. 20, 2018

(65) Prior Publication Data
US 2021/0275966 A1    Sep. 9, 2021

(51) Int. Cl.
*B01D 53/50*    (2006.01)
*B01D 53/78*    (2006.01)
(Continued)

(52) U.S. Cl.
CPC ........... *B01D 53/505* (2013.01); *B01D 45/14* (2013.01); *B01D 53/1481* (2013.01);
(Continued)

(58) Field of Classification Search
CPC ........ B01D 45/12; B01D 45/14; B01D 45/16; B01D 53/1481; B01D 53/24; B01D 53/50;
(Continued)

(56) References Cited

U.S. PATENT DOCUMENTS 3,008,543 A * 11/1961 Bourdale ............... B01D 46/24
55/283
9,155,994 B2 * 10/2015 Theis ..................... B01D 53/24
(Continued)

FOREIGN PATENT DOCUMENTS

EP    2 735 352    5/2014
GB         332 185 A  *  7/1930 ............. B04B 15/06
(Continued)

OTHER PUBLICATIONS

Reither P et al: "Schiffsemissionen: Schwefel—und Feinstaubminderung", Schiff und Hafen, Seehafen Verlag Gmbh, DE, vol. 60, No. 4, Apr. 1, 2008 (Apr. 1, 2008), pp. 54-57, XP001572644, ISSN: 1436:8498.

*Primary Examiner* — Timothy C Vanoy
(74) *Attorney, Agent, or Firm* — Mark P. Stone

(57) ABSTRACT

Methods and installations for treatment of exhaust gases from marine diesel engines, in particular for reduction of the sulphur oxides ($SO_x$) in such gases, where the reaction products resulting from the mixing of an alkaline aerosol with the exhaust gases are separated-out by means of one or more rotating centrifugal separator rotors (20) of the kind comprising a stack of narrowly spaced separation discs (22).

11 Claims, 4 Drawing Sheets

(51) Int. Cl.
*B01D 53/14* (2006.01)
*B01D 53/18* (2006.01)
*B01D 45/14* (2006.01)
*B04B 1/08* (2006.01)
*B04B 5/06* (2006.01)
*B04B 5/08* (2006.01)

(52) U.S. Cl.
CPC ....... *B01D 53/1493* (2013.01); *B01D 53/185* (2013.01); *B01D 53/502* (2013.01); *B01D 53/504* (2013.01); *B01D 53/78* (2013.01); *B04B 1/08* (2013.01); *B04B 5/06* (2013.01); *B04B 5/08* (2013.01); *B01D 2251/304* (2013.01); *B01D 2251/604* (2013.01); *B01D 2252/1035* (2013.01)

(58) Field of Classification Search
CPC .... B01D 53/501; B01D 53/504; B01D 53/78; B01D 53/92; B01D 2201/02; B01D 2201/36; B01D 2221/08; B01D 2257/302; B01D 2258/012; B01D 2258/0283; B01D 2259/4566; B01D 2279/30; B01J 19/1806; F01N 3/0214; F01N 3/0215; F01N 3/033; F01N 3/037; F01N 2240/06; F01N 2250/08; F01N 2290/02; F01N 2570/04; F01N 2590/02
See application file for complete search history.

(56) References Cited

U.S. PATENT DOCUMENTS

| | | | |
|---|---|---|---|
| 9,266,055 B2* | 2/2016 | Konigsson | B01D 21/262 |
| 9,770,690 B2* | 9/2017 | Takahashi | B01D 53/507 |
| 2016/0361727 A1* | 12/2016 | Konigsson | B04B 13/00 |
| 2018/0361312 A1* | 12/2018 | Mello | B01D 53/24 |

FOREIGN PATENT DOCUMENTS

| | | |
|---|---|---|
| JP | 2013 255876 | 12/2013 |
| WO | WO2008/065238 | 6/2008 |
| WO | WO2012/052243 | 4/2012 |
| WO | WO2012/113977 | 8/2012 |

\* cited by examiner

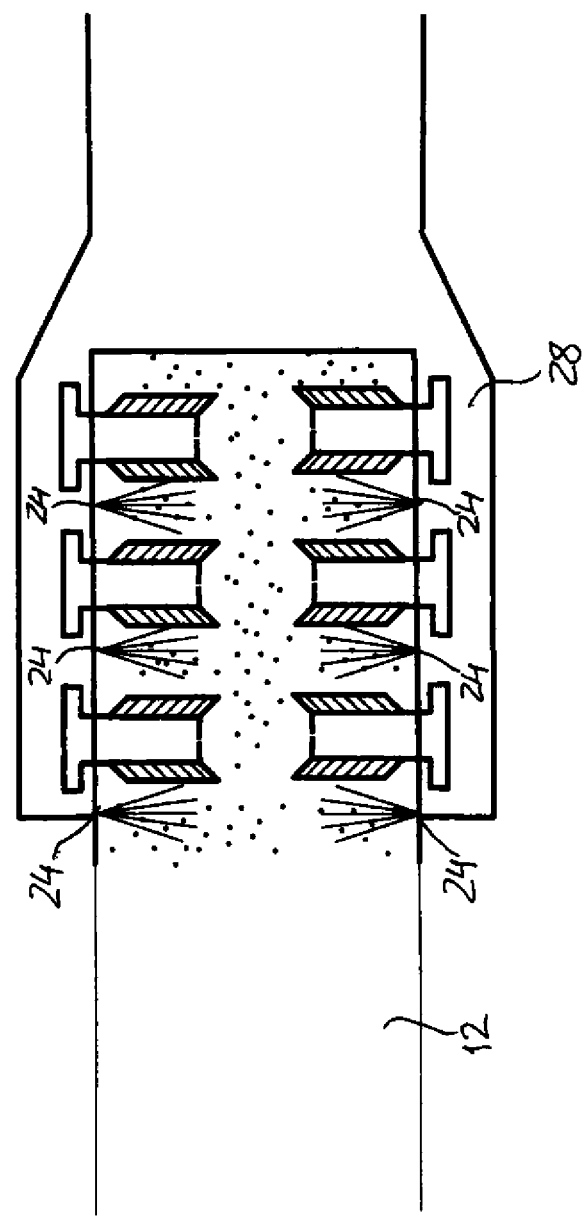

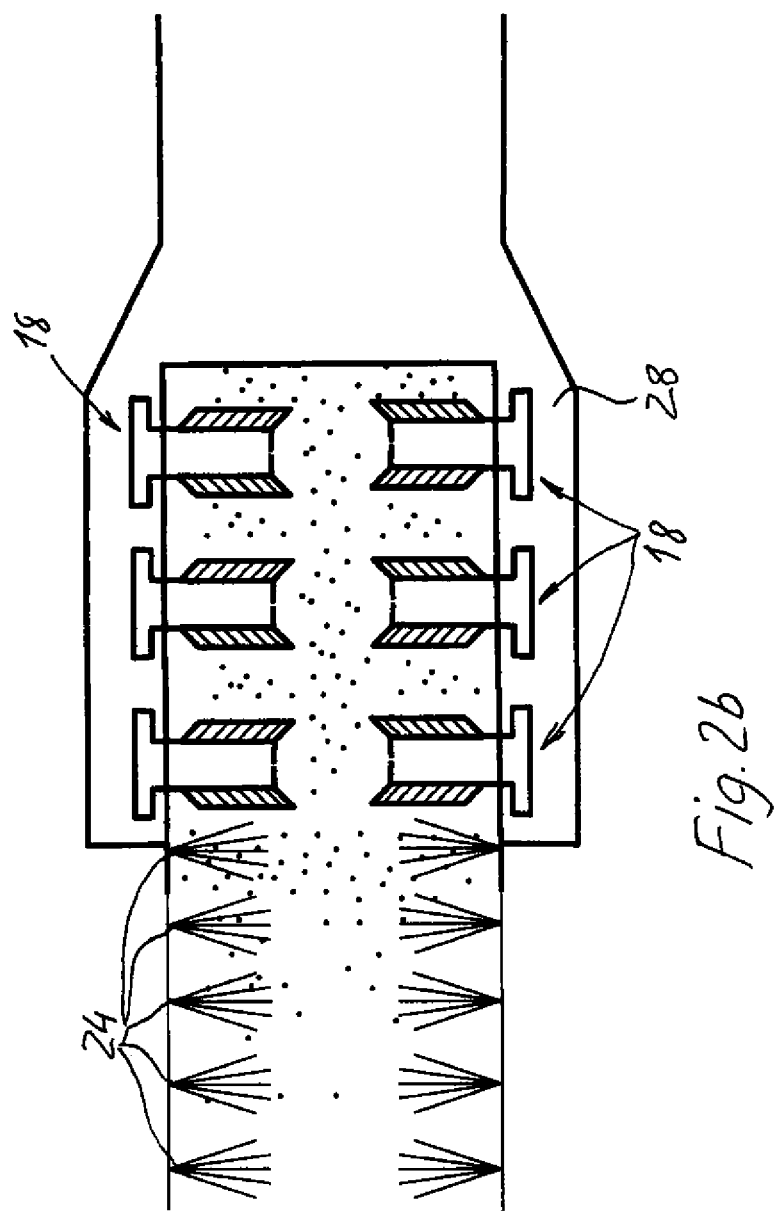

METHOD AND INSTALLATION FOR THE REDUCTION OF SULPHUR OXIDES IN EXHAUST GAS FROM MARINE DIESEL ENGINES

FIELD OF THE INVENTION

The present invention relates to methods and installations for treatment of exhaust gases from marine diesel engines, in particular for reduction of the sulphur oxides ($SO_x$) in such gases.

BACKGROUND OF THE INVENTION

The systems of today for reduction of sulphur oxides, such as sulphur dioxide, in the exhaust gases from diesel engines on ships are mainly based on various types of scrubbers. For this wet scrubbers are mostly used, where an aerosol of an alkaline solution, e.g. sodium hydroxide (NaOH), is sprayed into the scrubber in a so-called closed loop system, so as to bring it to react with the sulphur oxides to form e.g. water-soluble salts or other disposable reaction products. This is often the case when the ship is in a harbour or when the sea water in not sufficiently alkaline. In case the sea water itself is sufficiently alkaline, a so-called open loop system could be used at sea, where an aerosol of sea water is added to react with the sulphur oxides in the exhaust gases for the removal thereof.

These and other known systems for treatment of exhaust gases from marine engines are described more in detail in the publication "Understanding Exhaust Gas Treatment Systems, Guidance for Ship owners and Operators", published in June 2012 by Lloyd's Register.

Scrubbers for the treatment of large flows of exhaust gases from marine diesel engines, such as gas flows in the order of 50.000 $m^3/h$, are extremely big and expensive to manufacture and install. Typically, a full installation on ships for the treatment of the exhaust gases may cost in the order of 5 million Euros.

SUMMARY OF THE INVENTION

It is an object of the present invention to provide an improved method for reduction of the content of sulphur oxides ($SO_x$) in exhaust gases from a marine diesel engine, which requires a much less space and lower manufacturing and installation costs than conventional scrubber systems. Also, the efficiency of reducing the sulphur oxides in the exhaust gases could be substantially improved by the inventive method compared to the conventional scrubber systems.

For this purpose the method of the invention comprises the steps of:
a) introducing the exhaust gases into a reaction compartment, while
b) spraying, under high pressure, an aerosol of sea water with or without an alkaline addition, such as sodium hydroxide (NaOH), into the flow of the exhaust gases at the entrance of the gas flow into the reaction compartment and/or directly into the reaction compartment, so as to bring the sea water aerosol or an aerosol including an alkaline solution to react with the sulphur oxides in the exhaust gases to generate disposable reaction products thereof.

According to the invention the method is characterized by the step of:
c) causing a mixture containing gas, water and the reaction products to pass through a disc stack of at least one rotating centrifugal separator rotor so as to separate-out the reaction products and liquids from the gas due to centrifugal forces and discharging the cleaned gas to the environment.

Preferably, the mixture of gas, water and reaction products is caused to flow in a so-called counter-current manner through the rotor disc stack, although it could optionally flow in a co-current manner therethrough.

It is a further object of the invention to provide an installation for reducing the content of sulphur oxides ($SO_x$) such as $SO_2$ in the exhaust gases from a marine diesel engine, which is much more compact and functionally effective than the conventional scrubber installations as well as less expensive than these.

For this purpose the installation of the invention comprises an exhaust pipe for leading the exhaust gases from the engine towards an outlet for discharging exhaust gases cleaned from or with reduced content of sulphur oxides to the environment, and a reaction compartment for receiving the exhaust gases and an aerosol of sea water or an aerosol of an alkaline solution for reaction with the content of sulphur oxides of the exhaust gases.

According to the invention the installation is characterized in that at least one centrifugal separator rotor of the kind comprising a stack of narrowly spaced separation discs is arranged within or integrated with the reaction compartment for receiving a mixture of gas, water and reaction products and passing it through the disc stack of the centrifugal rotor for separating-out the reaction products and liquids from the gas due to centrifugal forces, said rotor having a gas outlet communicating with an exhaust gas outlet opening into the environment.

The concept of the present invention is thus based on a new application of rotor-type centrifugal separators, namely for cleaning of heavily polluted exhaust gases from sulphur oxides emanating from marine diesel engines.

Suitable embodiments of the installations of the invention are defined in the appended dependent claims.

Further features of the inventive methods and installations will described more in detail below with reference to the accompanying drawings.

BRIEF DESCRIPTION OF THE DRAWINGS

FIG. 2a is a view similar to FIG. 1 showing spray nozzles arranged at a separator section of the reaction compartment for injecting aerosols of alkaline sea water or other alkaline solutions into the exhaust gases;

FIG. 2b is a view similar to FIG. 2a but showing the nozzles arranged in a portion of the reaction compartment upstream of the separator section.

DETAILED DESCRIPTION OF PREFERRED EMBODIMENTS

Figure 1:
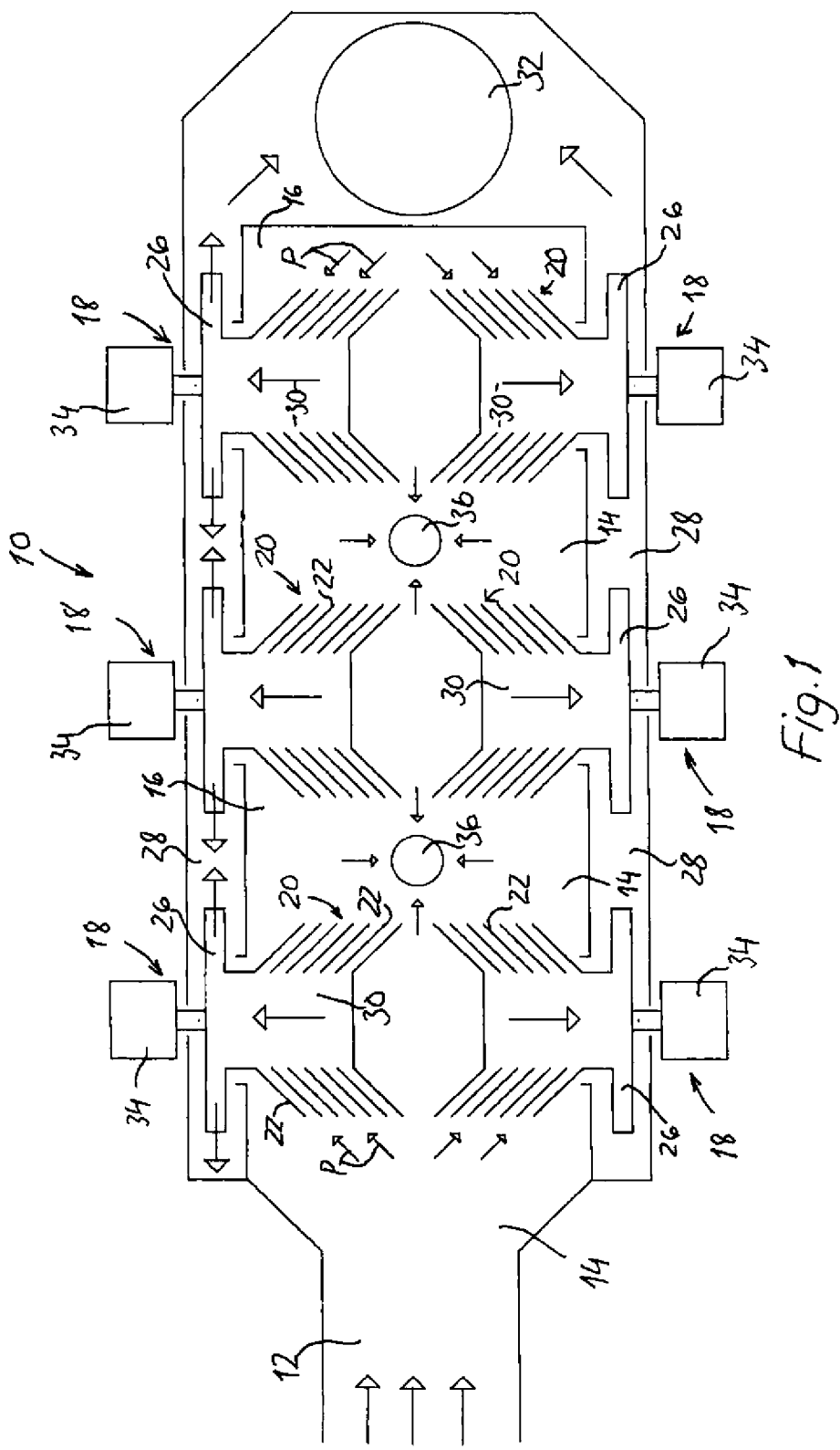
FIG. 1 is a schematic plan view of a first embodiment of a central portion of an installation of the present invention for reducing the content of sulphur oxides ($SO_x$) in the exhaust gases from a marine diesel engine.

FIG. 1 illustrates a first embodiment of an essential portion of an installation 10 of the present invention for reducing the content of sulphur oxides ($SO_x$) in the exhaust gases from a marine diesel engine. It includes an exhaust pipe 12 for leading the exhaust gases from a non-shown marine diesel engine out to the environment. According to the invention, in order to replace conventional space-requiring and expensive scrubbers normally used in the exhaust pipe for cleaning the exhaust diesel combustion gases from sulphur oxides the installation 10 of the present invention comprises a reaction compartment 14, which at a downstream section 16 thereof includes at least one, but preferably a plurality of centrifugal separators 18 of the kind having a rotor 20 with a stack of narrowly spaced conical separation discs 22. In the embodiment of FIG. 1 there are shown six such separators 18 arranged in parallel in the reaction compartment 14. The separators 18 are of a counter-current type, i.e. where the exhaust gases flow radially inwards (arrows P) through the interspaces between the rotor discs 22 against the pumping effect generated by the rotating rotors 20. Such rotor-type centrifugal separators 18 for centrifugal separation of solid and/or liquid particles from a flow of gas, e.g. crank case gases, are previously known per se from e.g. WO 2012/052243 A1.

FIG. 2a illustrates an arrangement of spray nozzles 24 for injecting, under high pressure, either sufficiently alkaline sea water or sea water mixed with an alkaline solution, such as sodium hydroxide (NaOH), into the exhaust gas flow so as to generate aerosols with a particle size down to approximately 2 μm for a fast reaction with the sulphur oxides in the gas flow. This nozzle arrangement is used when there is sufficient time for the necessary chemical reaction with the sulphur oxides within the separator section 16 of the reaction compartment 14.

Should a longer time be needed for sufficient reaction with the sulphur oxides the nozzles 24 could be arranged upstream of the separator section 16 of the reaction compartment 14, such as shown in FIG. 2b. Of course, the nozzles 24 could be arranged both in the separator section 16 and in the reaction compartment 14 upstream thereof.

As shown in FIGS. 1 and 2a-2b, each separator rotor 20 is provided with a fan 26 which rotates together with the rotor 20. The fan 26 is located in a chamber 28 which is separate from and encloses the separator section 16 of the reaction compartment 14 for enhancing the flow of cleaned gas from the central shaft 30 of the rotors 20 to the chamber 28 and further to an outlet 32 of the cleaned exhaust gas. Optionally, instead of an individual fan 26 for each separator 16, a common fan (not shown) may be arranged upstream or downstream of the reaction compartment 14 for feeding the mixture of exhaust gases, water and reaction products through the disc stack of the rotors 20 and discharging the gas of reduced sulphur oxide content to the exhaust gas outlet. The separator rotors 20 are driven either by an individual electric motor 34 or by a common electric motor and a belt transmission (not shown), similar to what is shown in FIG. 2 of WO 2012/052243 A1. In the reaction compartment 14 there is at least one outlet 36 for discharging the reaction products and liquids separated-out by the separator rotors 20.

Figure 3:
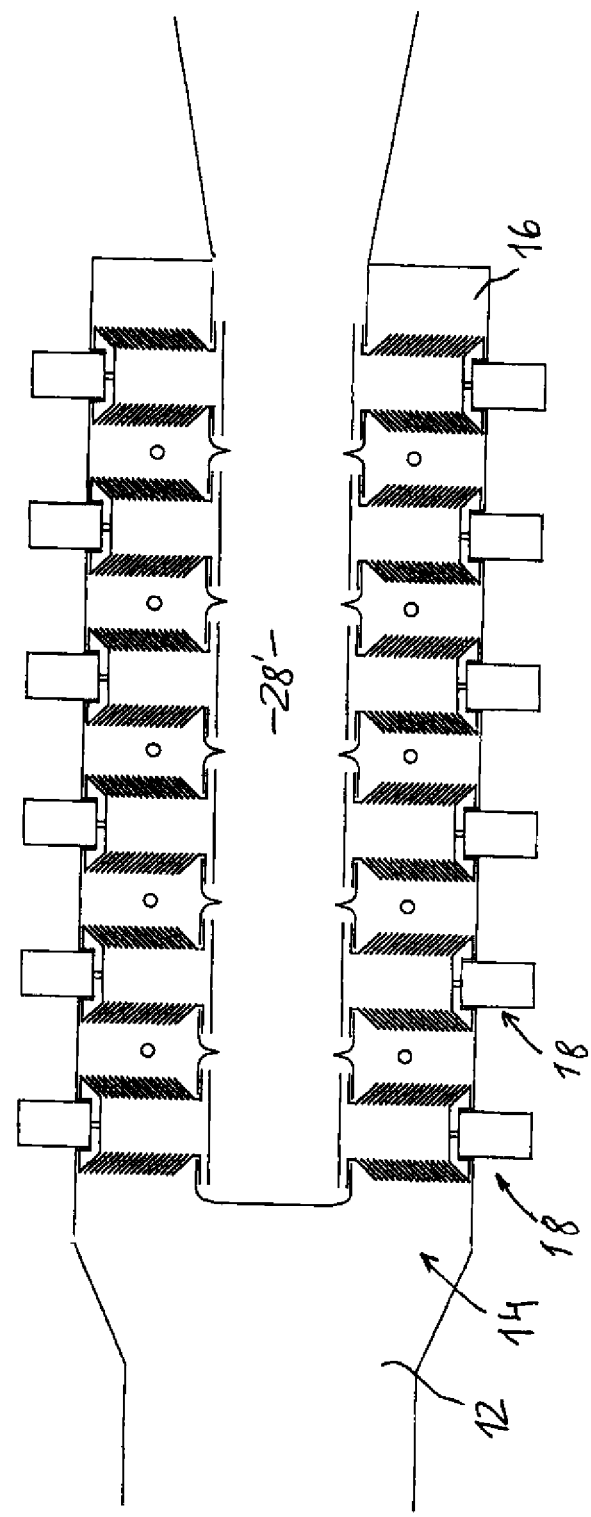
FIG. 3 is a schematic plan view of a second embodiment of the central portion of an installation of the present invention.

FIG. 3 discloses a second embodiment of the installation of the present invention having twelve rotor-type separators 18. In this embodiment the chamber 28' for receiving cleaned exhaust gas from the separators 18 is located centrally within the separator section 16 of the reaction compartment 14.

Optionally, the separators may be configured as co-current separators (not shown), where a mixture of exhaust gases and an aerosol of sea water with or without an alkaline addition may initially be sprayed directly into the central shaft of the rotors, which then can form a part of the reaction compartment, before the mixture flows radially outwards through the interspaces between the rotor discs, where the reaction products and water is separated-out from the gas by centrifugal forces.

Although the separation discs 22 of the rotors 20 are shown as conical discs in the drawings, they may be formed as substantially flat radial discs with rib-like fan wings (not shown) which also serves as distance members between the discs.

Even though, during the cleaning process sea water, with or without an alkaline addition, is normally used for spraying the exhaust gases in the reaction compartment, it is conceivable within the concept of the invention to use fresh water instead.

The invention claimed is:

1. Method for reduction of the content of sulphur oxides ($SO_x$) in exhaust gases from a marine diesel engine, comprising the steps of:
   a) introducing the exhaust gases into a reaction compartment (1), while
   b) spraying, under pressure, an aerosol of sea water with or without an alkaline addition, including sodium hydroxide (NaOH), into the flow of the exhaust gases at the entrance of the gas flow into the reaction compartment (1) and/or directly into the reaction compartment, so as to bring the sea water aerosol or an aerosol including an alkaline solution with aerosol drops of a size down to approximately 2 μm to react with the sulphur oxides in the exhaust gases to generate disposable reaction products thereof, and further including the step of:
   c) causing a mixture containing gas, water and the reaction products to pass through each of a plurality of rotating centrifugal separator rotors (20) arranged in parallel, each centrifugal separator rotor comprising a disc stack so as to separate-out the reaction products and liquids from the gas due to centrifugal forces and discharging the cleaned gas to the environment.

2. Method according to claim 1, characterized in that the mixture of gas, water and reaction products is caused to flow in a so-called counter-current manner through the rotor disc stack.

3. Method according to claim 1, characterized in that the mixture of gas, water and reaction products is caused to flow in a so-called co-current manner through the rotor disc stack.

4. Installation for reducing the content of sulphur oxides ($SO_x$) in exhaust gases from a marine diesel engine, comprising an exhaust pipe (12) for leading the exhaust gases from the engine towards an outlet for discharging exhaust gases cleaned from or with reduced content of sulphur oxides to the environment, and a reaction compartment (14) for receiving the exhaust gases and an aerosol of sea water or an aerosol of an alkaline solution for reaction with the content of sulphur oxides of the exhaust gases, characterized in that a plurality of centrifugal separator rotors (20) of the kind comprising a stack of interspaces between separation discs (22) are arranged in parallel within or integrated with the reaction compartment (14) for receiving a mixture of gas, water and reaction products and passing it through the disc stack of each of the centrifugal rotors (20) for separating-out the reaction products and liquids from the gas due to centrifugal forces, each said rotor (20) having a gas outlet (30) communicating with an exhaust gas outlet opening into a separate space (28, 28') either enclosing the reaction compartment (14) or located inside thereof, and one or more spray nozzles (24) are located at an entrance Portion of and/or within the reaction compartment (14) and configured to inject therein, under pressure, the aerosol of sea water or the aerosol of the alkaline solution with aerosol drops of a size down to approximately 2 μm into the flow of exhaust oases to each of the separator rotors (20).

5. Installation according to claim 4, characterized in that the rotors (20) are associated with at least one fan (26) for feeding the mixture of exhaust gases, water and reaction products through the disc stack of the rotors (20) and discharging the gas of reduced sulphur oxide content to the exhaust gas outlet.

6. Installation according to claim 5, characterized in that each rotor (20) is provided with an individual fan (26) located in said separate space (28; 28).

7. Installation according to claim 4, characterized in that the separation discs (22) are conical.

8. Installation according to claim 4, characterized in that the separation discs are shaped as substantially flat radial discs with radial rib-like fan wings which also serves as distance members between the discs.

9. Installation according to claim 4, characterized in that the reaction compartment is at least partly defined by an inlet shaft of the separator rotor of a co-current type of separator.

10. Installation according to claim 4, characterized in that the reaction compartment is at least partly defined by a casing enclosing the separator rotor of a counter-current type of separator.

11. Installation according to claim 4, characterized in that the rotors (20) are associated with at least one fan (26) for feeding the mixture of exhaust gases, water and reaction products through the disc stack of the rotors (20) and discharging the gas of reduced sulphur oxide content to the exhaust gas outlet.

* * * * *